United States Patent [19]

Conradi

[11] Patent Number: 6,061,369
[45] Date of Patent: May 9, 2000

[54] WAVELENGTH SELECTABLE FIBER LASER SYSTEM

[75] Inventor: Jan Conradi, Corning, N.Y.

[73] Assignee: Corning Incorporated, Corning, N.Y.

[21] Appl. No.: 09/323,723

[22] Filed: Jun. 1, 1999

[51] Int. Cl.$^7$ .................................. H01S 3/30; H01S 3/09
[52] U.S. Cl. .................................. 372/6; 372/31; 372/92; 372/108; 372/23; 372/26; 372/29; 372/69; 372/102
[58] Field of Search .................................. 372/6, 31, 92, 372/108, 23, 26, 29, 69, 102; 359/115, 124, 127; 385/14, 16; 356/341

[56] References Cited

U.S. PATENT DOCUMENTS 5,394,489   2/1995   Koch .

Primary Examiner—Frank G. Font
Assistant Examiner—Delma R. Flores Ruiz
Attorney, Agent, or Firm—Juliana Agon

[57] ABSTRACT

A fiber laser system including multiple fiber lasers fabricated to emit at respective different wavelengths when optically pumped by radiation at a pump wavelength. A pump laser emits the pump radiation and pumps one or more of the fiber lasers. The outputs of the fiber lasers are recombined onto a transmission fiber, preferably for use in a wavelength-division multiplexing (WDM) telecommunication system. In one set of embodiments, an optical switch switches the pump radiation to only one of the fiber lasers. A second switch controlled in correspondence to the first switch or a passive combiner, preferably a wavelength-division multiplexer, directs the output of the lasing fiber to an optical output path. In another embodiment, the one pump laser simultaneously pumps all the fiber lasers. One or more pump laser may be placed in parallel, and their outputs are combined. The parallel pump lasers may either be individually activated for redundancy or simultaneously operated for higher power.

33 Claims, 3 Drawing Sheets

WAVELENGTH SELECTABLE FIBER LASER SYSTEM

BACKGROUND OF THE INVENTION

1. Field of the Invention

The present invention relates generally to fiber lasers, and in particular to wavelength selectable fiber lasers.

2. Technical Background

Optical fiber has become the transmission medium of choice for telecommunication networks operating at high data rates and over long distances. A single optical fiber has an optical data capacity measured in terabits per second. However, data rates in operational networks are usually limited by the electronics at either end of the fiber. Currently, electronic data rates are limited to about 10 gigabits per second (Gb/s), and the electronic equipment operating at such rates is expensive and difficult to control in a field environment. Further increases in data rates are possible, but not by dramatic amounts using conventional equipment. In fact, much of the advanced communications network being used today operates at no more than 1 Gb/s.

Nonetheless, the data capacity of fiber networks can be significantly increased, even in the case of already-installed fibers, by the use of wavelength-division multiplexing (WDM). In WDM, the data transmitter includes multiple lasers operating within a preferred transmission wavelength band, but at slightly different wavelengths within the band. Each wavelength represents a separate transmission channel with the channels spaced across the band. Separate data signals are impressed on the different channels either by electronically modulating the source laser itself or by optically modulating the laser's output. The different data channels are optically multiplexed into the transmitting end of the one fiber. At the receiving end, the different channels are optically demultiplexed into physically separated paths, and respective optical receivers detect the modulated signals. As a result, for example, a 16-channel WDM system operating with 10 Gb/s electronics has an effective total capacity of 160Gb/s. To maximize capacity over a single fiber, the WDM channels of current systems may typically be spaced on the order of 0.4 nm, which is equivalent to 50 GHz at these wavelengths. For long-distance transmission, one preferred wavelength band occurs from 1530 to 1580 nm, corresponding to the minimum attenuation or loss for silica fiber.

In a point-to-point WDM architecture for a fiber communication system, a bank of wavelength-differentiated transmitters on one end of a section of fiber is matched by a bank of corresponding receivers at the other end. However, modern networks have complicated topologies with many interconnected nodes at which it is desired to switch channels in different directions. An example of a relatively simple network is a dual-fiber ring with many nodes distributed around the ring. If the network path is broken or interrupted at any point, the data can be redirected in the opposite direction on the ring to avoid the interruption. Such a ring network can be made "self-healing." A characteristic of such networks is that a relatively large amount of traffic passes through a node compared to the traffic dropped or added at the node.

To implement a conventional point-to-point fiber design on a network requires a complete set of transmitters and receivers at each network node if the different WDM signals on the incoming fiber will be directed into different outgoing fibers. An electronic switch is also required at the node if the channels are being switched on a frequent basis. Optical receivers and transmitters are expensive, particularly in view of the signal conditioning and control functions required in a modern network such as those in the telecommunications industry, and in a realistic network it is desired to minimize their number.

All-optical networks have been proposed to reduce the cost and complexity of high-capacity, multi-node networks. In these networks, each node includes the capability of optical switching which allows the extraction or insertion of only some of the WDM wavelengths at the node without the need to demodulate to electronic signals those optical signals merely passing through the node. Such wavelength-selective extraction and insertion of an optical data channel may be performed by a wavelength add-drop multiplexer (WADM). If the WADM serves as the interface to an electronic switch or network, an optical transmitter at one or more of the WDM wavelengths is required in association with the WADM to insert a data signal into the fiber network. As a result of the optical switching, optical transmitters and receivers and associated electronics are required at a node only for signal wavelengths originating or terminating at that node.

In one example of wavelength assignment in an all-optical WDM network, a first wavelength is assigned for transmitting from a first terminal node to a second terminal node, a second wavelength from the first terminal node to a third terminal node, a third wavelength from the second terminal node to the third terminal node, and so on.

However, such a distributed network with the different nodes generating respective optical signals and inserting them onto the same network requires close registration of wavelengths between the nodes. For example, if one receiving node is receiving two closely spaced wavelengths originating from different transmitting nodes and if those signals drift differently with temperature or time, as is likely with two widely dispersed transmitters, the two signals may interfere and the receiver cannot adequately separate them.

The International Telephone Union (ITU) has defined a set of discrete WDM wavelengths in the 1530–1580 nm band with 100 GHz spacing in what is often referred to as the ITU grid. It is strongly desired that the source lasers conforming to the ITU grid have narrow linewidths of less than 1 MHz and exhibit a stable frequency over the full ambient temperature range between −40 and +85° C. A maximum thermal frequency drift is required over this range of ±1 GHz (0.01 nm); less is desirable for close wavelength spacings. The source lasers should also have low relative intensity noise, which the ratio of signal to inherent noise.

Semiconductor lasers exhibit most of the characteristics required of source lasers, but the temperature dependence of their emission wavelength is very high. As a result, active temperature or wavelength control is required to maintain the output of semiconductor lasers within a narrow wavelength band despite wide excursions of the ambient temperature. Although close active control is available, it introduces undesirable complexity and cost for a fielded commercial system.

Fiber lasers have been developed which meet most of the requirements for a laser source in a fiber-based telecommunications system, including low relative intensity noise. Conventionally, a semiconductor diode laser or other intense light source optically pumps a fiber laser doped with specific ions to be optically active so that radiation in a fiber emission band is generated. A transmissive or reflective Bragg grating written into the fiber establishes the precise lasing wavelength within the fiber emission band. One of the frequencies of the ITU grid is selected for the Bragg grating. An advantage of writing the frequency into the silica fiber is that the silica has a small coefficient of thermal expansion ($\sim 5 \times 10^{-7}/°$ C.) and the resonant Bragg frequency changes with the same dependence. In particular, the center frequency of the Bragg grating in silica will normally vary by less than 10 GHz (0.1 nm) over a 100° C. range and by much less than that for such a change in ambient temperature if the fiber laser is appropriately packaged.

However, fiber lasers have only recently been developed as sources for a WDM network. In the typical configuration, each WDM wavelength requires a separate fiber written with the proper WDM wavelength and having its own pump source.

In many telecommunications architectures, each transmitter may at any one time be transmitting at only one of the many wavelengths in the ITU wavelength grid or perhaps at a limited number of the ITU wavelengths. However, it is greatly desired that the node have a capability of changing its transmission wavelength between different wavelengths in the ITU grid. For example, as traffic patterns change, it is may be advantageous to reassign the wavelengths between the different nodes, and it is desired that the reassignment be accomplished without physically replacing the laser sources at all the affected nodes.

Furthermore, in the provisioning phase, it is desired that a separate part not be identified to each ITU frequency because the number of parts required to be inventoried in the warehouse or on the repair truck increases commensurately with the number of ITU frequencies being used. It is instead greatly preferred that the number of possible laser sources be reduced and that a single laser source be capable of emitting at any one of several of the ITU frequencies with the frequency selection of the laser source being achieved by a mechanical or preferably electrical adjustment in the field.

Multi-wavelength lasers are also needed for a wavelength-interchanging cross-connect (WIXC), which is an optical device linking two or more WDM networks. A WIXC has the capability of switching one or more selected signals from one WDM network to another with the carrier wavelengths being possibly changed between the two networks. The wavelength conversion conserves the number of wavelengths since only a limited amount of traffic is usually switched from one network to another. At the present time, the wavelength conversion requires demodulation to an electronic signal and a laser source emitting at the new wavelength and modulated by the electronic signal. For reasons based on both provisioning and wavelength reallocation, a multi-wavelength laser source is desired for a WIXC.

Furthermore, diode lasers are expensive and their cooling somewhat complex so that it is uneconomical to use more than are really necessary. On the other hand, diode lasers tend to experience short lifetimes in view of their usually high operating temperatures. It would be desirable to design a WDM system in which the number of laser diodes is reduced, but which also allows quick substitution for a failed laser. It is also desirable to increase the pumping power from diode lasers without the need to change the diode design.

Conventional fiber laser systems do not satisfy these different objectives.

SUMMARY OF THE INVENTION

In one aspect of the invention, one optical pump source is used to pump multiple fiber lasers, each designed to lase at respective different frequencies, particularly closely-spaced frequencies used for wavelength-division multiplexing telecommunication systems. The outputs of the fiber lasers may be modulated and combined for transmission over a single fiber. Alternatively, the output may serve as the wavelength-selectable input to a multi-wavelength communication system.

The laser fibers may be all pumped simultaneously or an optical switch may be disposed between the pump source and the fiber lasers to pump only one laser at any one time. A second optical switch—controlled in correspondence to the first optical switch—may be placed to receive the outputs of the fiber lasers to switch the one lasing fiber to a single output. Passive combiners may also be used, preferably such as a wavelength-division multiplexer.

Additional optical pump sources may be disposed in parallel to the first one and operated in the event the first pump source fails or is otherwise inactivated. Alternatively the pump sources be used together, and their outputs combined to increase the pump power delivered to the fiber lasers.

DETAILED DESCRIPTION OF THE PREFERRED EMBODIMENTS

The invention allows the use of one optical pump source to pump a plurality of fiber lasers operating at different or discrete wavelengths.

Figure 1:
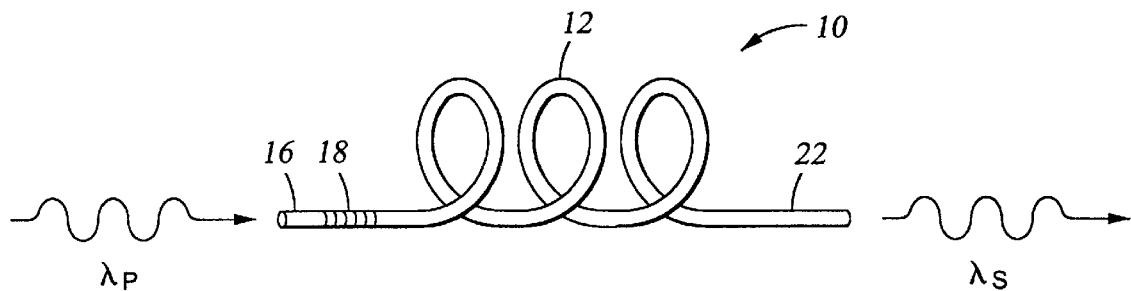
FIG. 1 is a schematic illustration of a single fiber laser.

One fiber laser 10 representative of the multiple fiber lasers is illustrated schematically in FIG. 1. Its active portion may be based upon an erbium-doped fiber 12 having a length of a few centimeters up to tens of meters. An optical pump source injects a strong optical pump signal at a pump wavelength $\lambda_P$ into the input end 16 of the fiber 12. The pump signal of proper wavelength excites erbium ions $Er^{+3}$ in the fiber 12, whether of silica or other material, into one of a series of excited atomic states. The pump source is typically a semiconductor laser diode with an emission pump wavelength $\lambda_P$ determined by its precise semiconductor composition and associated structure. An optical transition in the erbium-doped fiber corresponding to wavelengths in the range of 1530–1630 nm can be made to lase at signal wavelengths $\lambda_S$ within this band if the pump signal within bands around 980 nm or 1480 nm is strong enough and the fiber is formed into an optical cavity. Other optically active dopant ions may be used to obtain lasing at other wavelengths.

Lasers exhibiting a narrow emission linewidth and stable emission frequency are commonly implemented as distributed feedback (DFB) lasers or as distributed Bragg reflector (DBR) lasers. DFB lasers have a Bragg grating distributed through at least part of the active or lasing region to continuously select a wavelength while DBR lasers have one or more Bragg gratings at the ends of the active or lasing region to act as frequency-selective mirrors. A grating 18 is schematically illustrated in FIG. 1. Its size and location and possible multiplicity of gratings are not limited by the illustration. The periodicity of the one or more gratings cause them to serve as a wavelength selector since the grating periodicity defines the lasing wavelength $\lambda_S$ or equivalently the lasing frequency, which may be set to one of the frequencies of the ITU grid.

It is well known how to write the Bragg grating into silica fiber by exposing the fiber to ultraviolet light through an appropriate mask. The strength of the gratings may be varied from one end of the lasing region to the other to control the direction from which most of the light exits the laser.

If the pump light is strong enough, the cavity including the doped fiber lases at the wavelength $\lambda_S$ determined by the Bragg grating 18 and outputs lasing light at $\lambda_S$ from the output end 22.

Other configurations of fiber lasers are possible that share many of the fundamental characteristics of the laser 10 illustrated in FIG. 1. As will be explained later, it is possible to input pump light and output lasing light from the same end of the fiber 12. The schematic illustration does not include several elements commonly used in operational systems such as isolators, power limiters, and optical filters or reflectors discriminating between pump and lasing light, but these are conventional elements not directly related to the invention.

Figure 2:
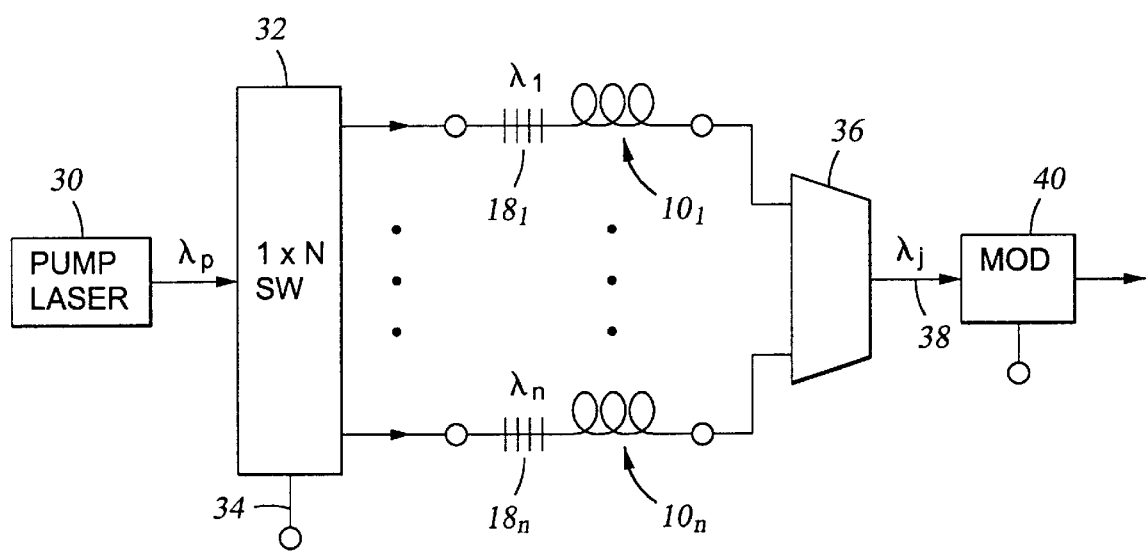
FIG. 2 is an opto-electronic circuit diagram of a first embodiment of the invention using a 1×N optical switch at the input and a generalized combiner on the output.

A first embodiment of the invention, illustrated in the electro-optical circuit diagram of FIG. 2, includes a single pump laser 30 emitting pump radiation at a pump wavelength $\lambda_P$, a 1×N optical switch 32 receiving the pump signal on an input port, and N fiber lasers $10_1 \ldots 10_N$ receiving the pump signal from respective ones of the N output ports of the 1×N switch 32. The N fiber lasers $10_1 \ldots 10_N$ may have structures similar to that of laser 10 of FIG. 1 but with respective Bragg gratings $18_1 \ldots 18_N$ having different and discrete periods corresponding to N wavelengths $\lambda_1 \ldots \lambda_N$. Although even fiber lasers designed to operate at a same wavelength in practice output slightly different wavelengths, in the context of the invention the different wavelengths have discrete and identifiable values associated with the system in which they are incorporated. For an optical telecommunications network, the N wavelengths $\lambda_1 \ldots \lambda_N$ may all be different wavelengths of the ITU grid. The structure of the pump source 30 is not crucial as long as it emits high-intensity radiation of the required wavelength.

The 1×N switch 32 may mechanically move fibers or mirrors or may be based on different optical effects, such as thermo-optical switches or various types of arrayed waveguides structures with electro-optical control elements. A control 34 to the 1×N switch 32 controls the optical switching through the switch 32 and thus determines which laser $10_j$ receives the pump signal through the switch 32. That laser $10_j$ lases to output an optical signal at wavelength $\lambda_j$. The other lasers, not being pumped, do not lase. The optical connections between the pump laser 30, the switch 32, and the lasers $10_1 \ldots 10_N$ are preferably fiber, but free-space optical paths, planar waveguides, or other optical transmission means may be used.

The outputs of the N fiber lasers $10_1 \ldots 10_N$ are connected to input ports of an optical combiner 36 and are therein combined. The combiner output port is connected to a fiber 38 or other optical path into the WDM network. Depending upon the selected state of the 1×N switch 32, the fiber 38 carries a selected one wavelength $\lambda_j$ of the N wavelengths $\lambda_1 \ldots \lambda_N$. The combiner 36 may be a passive coupler that is non-selective to frequency. However, such a simple combiner suffers from relatively high insertion loss. Other types of combiners will be described for other embodiments. Usually, a single optical modulator 40 is placed on the optical path 38 to modulate the CW laser light according to an electrical data signal.

Figure 3:
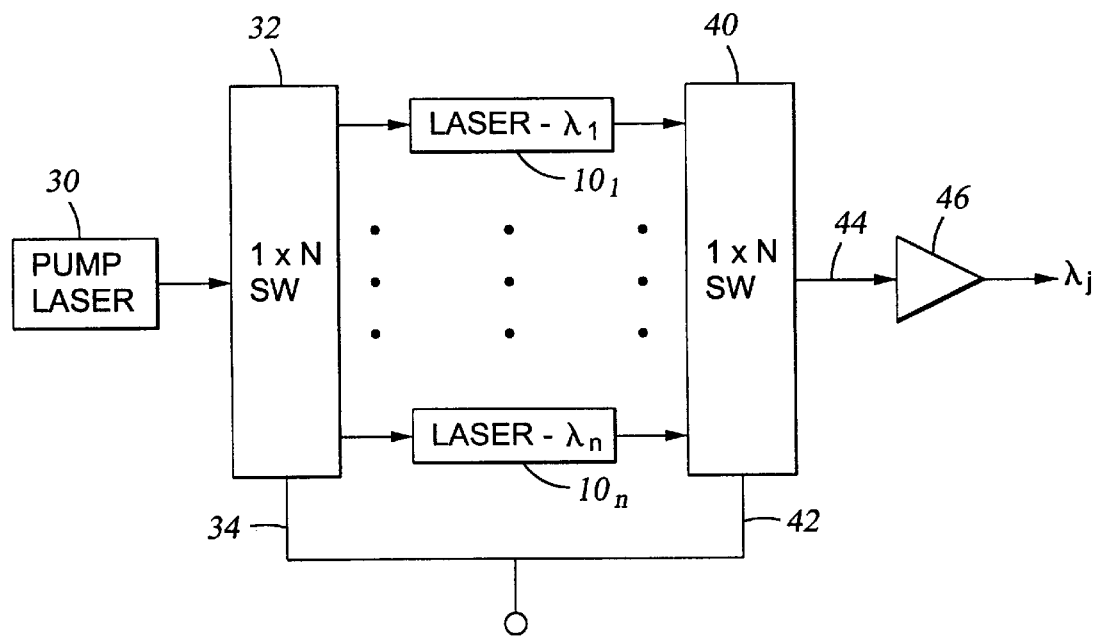
FIG. 3 is an opto-electronic circuit diagram of a second embodiment of the invention using optical switches on both the input and output.

A second embodiment of the invention is illustrated in the opto-electronic circuit diagram of FIG. 3. The pump laser 30, the input 1×N switch 32, and the N fiber lasers $10_1 \ldots 10_N$ are similar to those of FIG. 2. Preferably, however, the Bragg gratings $18_1 \ldots 18^N$ are implemented as distributed Bragg reflectors predominantly positioned at the input end 16 so that the lasers lase most strongly in the forward direction, that is, along the direction of propagation of the pump light. The optical outputs of the lasers $10_1 \ldots 10_N$ are received by N input ports of a 1×N output switch 41. A control 42 for the switching state of the output switch 42 is synchronized to the control 34 of the input switch 32 so that the two switches 32, 41 are selected to common switching states. The output switch 41 switches the one lasing wavelength to a single output port connected to an output line 44. The two switches 32, 41 may need to be designed differently since the input switch 32 must pass the pump wavelength $\lambda_P$ while the output switch 41 must pass the laser wavelengths $\lambda_1 \ldots \lambda_N$. This configuration has the further advantage that residual pumping signal is also switched if the output switch 41 has sufficiently wide bandwidth, and the extra pumping signal can be used by an optically pumped optical amplifier 46, such as an erbium-doped fiber amplifier (EDFA), to further amplify the signal of whatever wavelength is lasing. Only one optical amplifier 46 is needed for the N fiber lasers $10_1 \ldots 10_N$.

Figure 4:
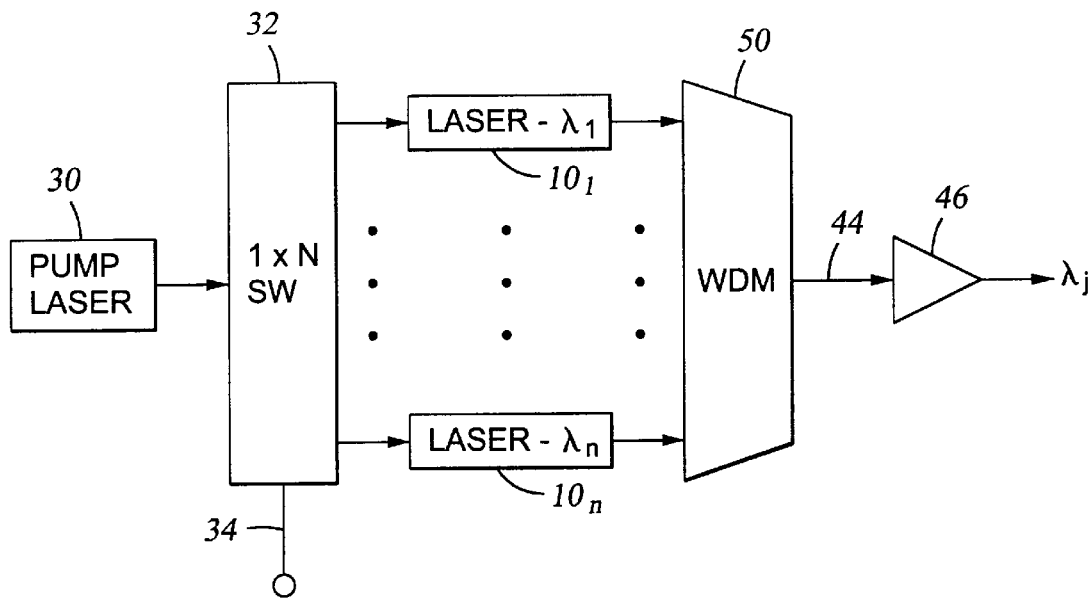
FIG. 4 is an opto-electronic circuit diagram of a third embodiment of the invention using a wavelength-division multiplexer on the output.

A third embodiment of the invention, illustrated in the opto-electronic schematic of FIG. 4, is similar to the embodiment of FIG. 3 except that a passive wavelength-division multiplexer 50 is used on the output side to pass to its output port connected to the output line 44 whatever laser signal is being produced by the lasers $10_1 \ldots 10_N$. A wavelength-division multiplexer (WDM) is usually a passive device, and it can be based, for example, on thin-film filters, fiber Bragg gratings, oe planar waveguide structures such as passive arrayed waveguides. Operated in the reverse direction from that illustrated, it can divide an optical signal into different components according to wavelength. Operated in the illustrated direction with the wavelengths of the illustrated N input ports matched to the lasing wavelengths $\lambda_1 \ldots \lambda_N$, a WDM offers both simplicity and low insertion loss.

If the wavelength-division multiplexer 50 is designed to accommodate both the laser wavelengths $\lambda_1 \ldots \lambda_N$ and the pump wavelength $\lambda_P$, then the optical amplifier (EDFA) 46 can be added to use the residual pump power to raise the total output power of the selected wavelength. The modulator 40 of FIG. 1 may be placed either before or after the optical amplifier 46.

Figure 5:
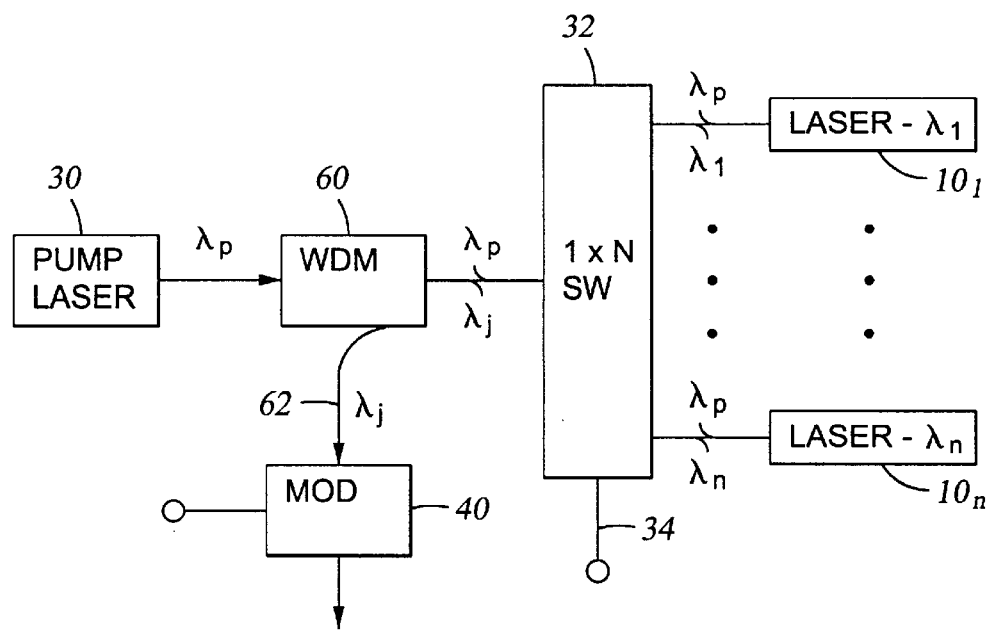
FIG. 5 is an opto-electronic circuit diagram of a fourth embodiment of the invention using one switch and backwardly pumped fiber lasers.

A fourth embodiment of the invention, illustrated in the opto-electronic circuit diagram of FIG. 5, pumps the lasers $10_1 \ldots 10_N$ in the backward direction. That is, the lasing light propagates backwards relative to the pump radiation. The lasers $10_1 \ldots 10_N$ are made to lase primarily in the backward direction, for example, by positioning a strong distributed Bragg reflector at the far end of the fiber opposite the source of the pump radiation. The pump source 30 directs the pump radiation through a wavelength-division multiplexer 60 that is selective between the pump wavelength $\lambda_P$ on one hand and the laser wavelengths $\lambda_1 \ldots \lambda_N$ on the other. The wavelength-division multiplexer 60 thus directs the pump radiation to the 1×N switch 32, which switches the pump radiation to a selected one of the fiber lasers $10_1 \ldots 10_N$. That laser $10_j$ lases at the wavelength $\lambda_j$, and the lasing radiation is directed back through the switch 32 to the wavelength-division multiplexer 60. The switch 32 needs to be able to switch both the pump wavelength $\lambda_P$ and the laser wavelengths $\lambda_1 \ldots \lambda_N$. The wavelength-division multiplexer 60 directs the lasing light at wavelength $\lambda_j$ to an optical output path 62 through the modulator 40.

Figure 6:
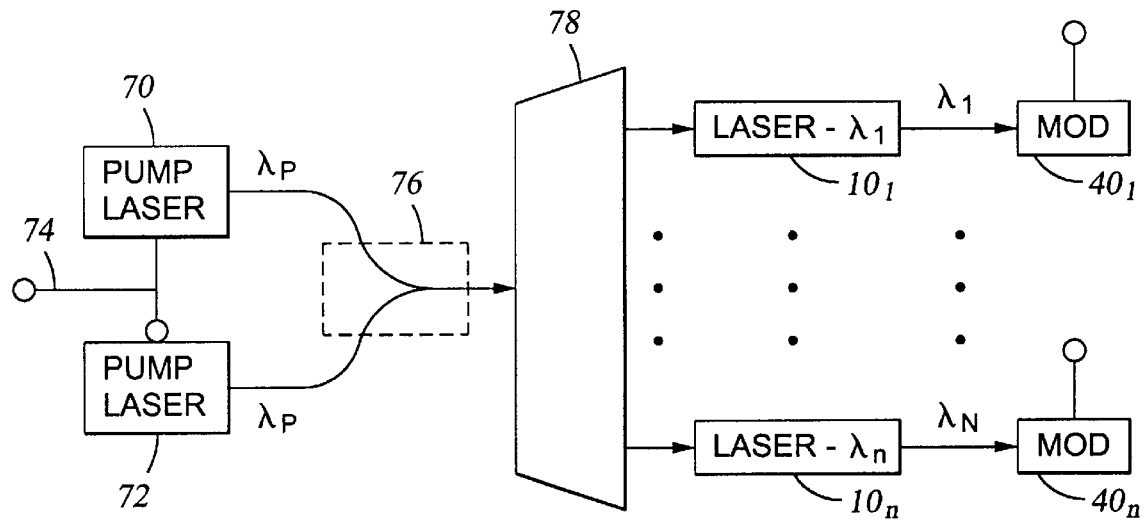
FIG. 6 is an opto-electronic circuit diagram of a fifth embodiment of the invention using multiple pump sources and many simultaneously emitting fiber lasers.

A fifth embodiment of the invention illustrated in the opto-electronic schematic of FIG. 6 includes two or more pump lasers 70, 72 of similar construction although they may emit radiation at somewhat different wavelengths as long as the multiple wavelengths are within the pumping wavelength band of the doped fiber. In one sub-embodiment, the multiple lasers 70, 72 are all operated together and their outputs combined to thereby increase the pump power delivered to the fiber lasers. In another sub-embodiment, a control alternately turns one on and the other off, thereby providing redundancy and increased reliability and lifetime over a single pump laser. The outputs of the pump lasers 70, 72 are connected to input ports of a coupler 76 and are combined therein. The output port of the coupler 76 is connected to the input port of a divider 78 having N output ports. The divider may be multiple stages of Y-couplers arranged in the orientation opposite to that of the illustrated coupler 76. A generalized optical coupler arranged between the pump laser 70, 72 and the fiber lasers $10_1 \ldots 10_N$ has M input ports for M pump lasers and N output ports for the N fiber lasers. Thereby, the coupler provides pump radiation at wavelength $\lambda_P$ to all of N lasers $10_1 \ldots 10_N$ simultaneously emitting at the respective wavelengths $\lambda_1 \ldots \lambda_N$. The outputs of the lasers $10_1 \ldots 10_N$ are led to respective ones of N modulators $40_1 \ldots 40_N$, which modulate the optical carrier signals according to respective electrical data signals.

The embodiment of FIG. 6, when the pump lasers are alternately selected, requires strong pump lasers 70, 72, each capable of driving N fibers lasers $10_1 \ldots 10_N$. The design is advantageous in the case where switches are expensive and pump lasers are powerful. When the multiple pump lasers 70, 72 are simultaneously emitting, their individual power levels required to drive the one or more fiber lasers are commensurately reduced.

The design of FIG. 6 could include only one of the two pump lasers 70, 72. However, the redundancy of two pump sources protects against the failure of one of them, thereby protecting all N signal sources, or the multiplicity of sources operating in parallel multiplies the intensity of the pumping power. More than two pump lasers may be placed in parallel, either for more power, for more redundancy, or for a combination of more power and redundancy. The multiple pump lasers 70, 72 of FIG. 6 may be combined with the 1×N optical switch 32 of FIGS. 2 through 4.

The invention thus provides a cost-effective and reliable fiber laser capable of emitting at more than one wavelength. Nonetheless, the parts of the system are individually conventional.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A fiber laser system connectable to at least one light source emitting pump radiation comprising:

an optical coupler having at least one optical input port connectable to respective ones of the at least one light source and having a plurality of optical output ports; and a plurality of fiber lasers having respective first ends connected to respective ones of the optical output ports and each being capable of lasing at a respective one of a plurality of discrete emission wavelengths when pumped by the pump radiation, whereby lasing light is emittable from respective ones of the fiber lasers.

2. The fiber laser system of claim 1 wherein each of the fiber lasers includes a respective wavelength selector extending along a length of the fiber with a respective one of a plurality of discrete selecting periods.

3. The fiber laser system of claim 1 wherein the optical coupler comprises an optical divider, whereby pump radiation supplied to the at least one optical input port is simultaneously provided to all of the fiber lasers.

4. The fiber laser system of claim 1 wherein the optical coupler comprises an optical switch in which the at least one optical input is selectively connectable to any one of the plurality of optical output ports.

5. A fiber laser system connectable to a source of pump radiation comprising:

an optical switch having N optical output ports and an optical input port connectable to the source of pump radiation and selectively connected to any one of the N optical output ports, N being greater than 1; and N fiber lasers connected to respective ones of the N optical output ports of the optical switch and including respective optical fibers, each of which is doped with ions to be excitable into at least one excited state by the pump radiation, whereby is light is lasable within the fiber within a wavelength band, and includes a respective wavelength selector extending along a length of the fiber causing the respective fiber lasers to lase at N respective and discrete wavelengths within the band when pumped by the pump radiation.

6. The fiber laser system of claim 5 wherein each of the wavelength selectors comprises one or more gratings written into the respective fiber.

7. A fiber laser system connectable to a plurality of sources of pump radiation comprising:

a plurality of fiber lasers, each capable of lasing at a respective one of a plurality of discrete emission wavelengths when pumped by the pump radiation; and an optical coupler having a plurality of optical input ports connectable to respective ones of the plurality of sources of pump radiation, combining light received on the plurality of input ports, and having a plurality of optical output ports connected to respective ones of the plurality of fiber lasers.

8. The fiber laser system of claim 7 wherein the coupler is passive.

9. The fiber laser system of claim 7 wherein the coupler is a divider, whereby all of the optical output ports are simultaneously optically connectable to all the optical input ports.

10. The fiber laser system of claim 7 wherein the coupler includes an optical switch selectively and optically connecting any one of the optical input ports to the optical output ports.

11. The fiber laser system of claim 6 further comprising an optical combiner having a plurality of second optical inputs ports connected to respective ones of the fiber lasers and a second optical output port connected to all the second optical input ports.

12. A fiber laser system connectable to a light source providing optical pump radiation to the system comprising:
   a first optical switch having a plurality of first optical output ports and a first optical input port connectable to the light source and selectively connected to any one of the first optical input ports, and
   a plurality of fiber lasers connected to respective ones of the first optical output ports, and each being capable of lasing at a respective one of a plurality of discrete emission wavelengths when pumped by the optical pump radiation, whereby lasing light is emittable from a selected one of the fiber lasers.

13. The fiber laser system of claim 11 further comprising an optical coupler having a plurality of second optical input ports connected to respective ones of the fiber lasers and one second optical output port providing a single optical output therefrom.

14. The fiber laser system of claim 13 wherein the optical coupler is passive.

15. The fiber laser system of claim 13 wherein the optical coupler comprises a wavelength-division multiplexer.

16. The fiber laser system of claim 13 wherein the optical coupler comprises a second optical switch selectively connecting the second optical output port to any one of the second optical input ports.

17. The fiber laser system of claim 16 wherein the first and second optical switches are switched in correspondence to each other.

18. The fiber laser system of claim 11 wherein each of the fiber lasers includes a fiber doped with an optically excitable ion and a grating with a respective period written into the fiber, the respective periods of the gratings differing discretely between the fiber lasers.

19. A fiber laser system comprising:
   a light source emitting radiation at a pump wavelength; and
   a plurality of fiber lasers connectable to the light source and each capable of lasing at a respective one of a plurality of different emission wavelengths when pumped by the radiation at the pump wavelength, whereby lasing light is emittable at a respective end of each optical fiber.

20. The fiber laser system of claim 19 further comprising:
   an optical coupler having a plurality of optical input ports receiving the optical outputs from respective ones of the plurality of fiber lasers and having an optical output port connectable to the plurality of optical input ports.

21. The fiber laser system of claim 20 wherein the optical coupler is passive.

22. The fiber laser system of claim 20 wherein the optical output port is simultaneously connected to all of the optical input ports.

23. The fiber laser system of claim 20 wherein the optical coupler comprises a switch.

24. The fiber laser system of claim 20 wherein the optical coupler comprises a wavelength-division multiplexer.

25. The fiber laser system of claim 19 further comprising:
   a first optical switch having a plurality of optical output ports connected to respective ones of the plurality of the fibers lasers and an optical input port connected to the light source and selectively connectable to any of the optical output ports.

26. The fiber laser system of claim 25 further comprising:
   a second optical switch having second optical input ports connected to respective ones of the plurality of from all of the fiber lasers and having a second optical output port selectively connectable to any of said second optical input ports and providing a common output from all of the fiber lasers.

27. The fiber laser system of claim 26, wherein the first and second optical switches are switched in correspondence to each other.

28. The fiber laser system of claim 19, wherein each of the fiber lasers includes a fiber doped with an optically excitable ion and a grating with a respective period written into the fiber, the respective periods of the gratings differing discretely between the fiber lasers.

29. The fiber laser system of claim 19 wherein the light source is a first light source and further comprising:
   a second light source emitting radiation at a pump wavelength; and
   an optical coupler receiving outputs of the first and second light sources and having an output connectable to any of the fiber lasers.

30. The fiber laser system of claim 29 wherein the first and second light sources are activatable in alternation.

31. The fiber laser system of claim 29 wherein the first and second light sources operate simultaneously.

32. The fiber laser system of claim 29 further comprising:
   an optical divider receiving an output of the optical coupler and providing simultaneous outputs to all of the fiber lasers.

33. The fiber laser system of claim 29, further comprising: an optical switch selectively connectable between the optical coupler and any one of the fibers lasers.

* * * * *